US010099146B2

United States Patent
Luo et al.

(10) Patent No.: US 10,099,146 B2
(45) Date of Patent: Oct. 16, 2018

(54) METHOD, TERMINAL DEVICE, AND STORAGE MEDIUM FOR PLAYING GAME IN CHATTING INTERFACE

(71) Applicant: Xiaomi Inc., Beijing (CN)

(72) Inventors: Jixi Luo, Beijing (CN); Jinbin Lin, Beijing (CN); Xiaojian Shi, Beijing (CN)

(73) Assignee: Xiaomi Inc., Beijing (CN)

( * ) Notice: Subject to any disclaimer, the term of this patent is extended or adjusted under 35 U.S.C. 154(b) by 115 days.

(21) Appl. No.: 15/139,583

(22) Filed: Apr. 27, 2016

(65) Prior Publication Data

US 2017/0050114 A1 Feb. 23, 2017

(30) Foreign Application Priority Data

Aug. 19, 2015 (CN) .......................... 2015 1 0512500

(51) Int. Cl.
| | |
|---|---|
| A63F 13/00 | (2014.01) |
| A63F 13/87 | (2014.01) |
| H04L 12/58 | (2006.01) |
| A63F 13/92 | (2014.01) |
| A63F 13/55 | (2014.01) |

(52) U.S. Cl.
CPC .............. *A63F 13/87* (2014.09); *A63F 13/55* (2014.09); *A63F 13/92* (2014.09); *H04L 51/046* (2013.01)

(58) Field of Classification Search
CPC .......... A63F 13/20; A63F 13/22; A63F 13/31; A63F 13/34; A63F 13/45
See application file for complete search history.

(56) References Cited

U.S. PATENT DOCUMENTS

2004/0224772 A1* 11/2004 Canessa .................. A63F 13/12
463/42

FOREIGN PATENT DOCUMENTS

| CN | 101106560 A | 1/2008 |
|---|---|---|
| CN | 101562581 A | 10/2009 |
| CN | 103927208 A | 7/2014 |

(Continued)

OTHER PUBLICATIONS

English translation of International Search Report issued by the State Intellectual Property Office of the P.R. China dated May 20, 2016, in counterpart International Application No. PCT/CN2015/097713.

(Continued)

*Primary Examiner* — James S McClellan
(74) *Attorney, Agent, or Firm* — Finnegan, Henderson, Farabow, Garrett & Dunner LLP

(57) ABSTRACT

The present disclosure relates to a method, a terminal device, and a storage medium for playing a game in a chatting interface of an instant messaging tool provided on a terminal device. The method includes: calling a game program corresponding to a game mode in the chatting interface when the game mode is triggered in the chatting interface, the chatting interface being a chatting interface between a current user and one or more other users of the instant messaging tool on a terminal device, and the game mode being a mode of presenting the game in the chatting interface for user interaction; acquiring a first game result collected by the game program when the game program is finished; and sending the first game result as an instant message to the one or more other users in the chatting interface.

12 Claims, 10 Drawing Sheets

(56) References Cited

FOREIGN PATENT DOCUMENTS

| | | |
|---|---|---|
| CN | 104035965 A | 9/2014 |
| CN | 104391628 A | 3/2015 |
| CN | 104811911 A | 7/2015 |
| EP | 1 906 345 A1 | 4/2008 |
| EP | 2 015 539 A2 | 1/2009 |
| JP | 2015077290 A | 4/2015 |
| KR | 10-1130381 B | 3/2012 |
| WO | WO 2010/135896 A1 | 12/2010 |
| WO | WO 2013/047446 A1 | 4/2013 |

OTHER PUBLICATIONS

Extended European Search Report dated Jan. 23, 2017, in counterpart European Application No. 16166813.2-1862.

* cited by examiner

METHOD, TERMINAL DEVICE, AND STORAGE MEDIUM FOR PLAYING GAME IN CHATTING INTERFACE

CROSS-REFERENCE TO RELATED APPLICATIONS

This application is based upon and claims the priority of Chinese Patent Application No. 201510512500.8 filed on Aug. 19, 2015, which is incorporated herein by reference in its entirety.

TECHNICAL FIELD

The present disclosure relates to the technical field of Internet and, more particularly, to a method, a terminal device, and a storage medium for playing a game in a chatting interface.

BACKGROUND

Along with more and more functions provided by an instant messaging tool, a user can use the instant messaging tool for multimedia chatting, such as voice chatting and video chatting, and can also send a file to a chatting peer, etc. When chatting with the peer by the instant messaging tool, the user usually need not to only pay attention to the chatting content but often has spare energy. For example, when waiting for a reply from the peer, the process of waiting seems to be monotonous without fully mobilize the user's senses. Therefore, the instant messaging tool may have not brought full play of the functions of a terminal device.

SUMMARY

According to a first aspect of the present disclosure, there is provided a method for playing a game in a chatting interface of an instant messaging tool provided on a terminal device. The method includes: calling a first game program corresponding to a game mode in the chatting interface of the instant messaging tool when the game mode is triggered in the chatting interface, the chatting interface being a chatting interface between a current user and one or more other users of the instant messaging tool; and the game mode being a mode of presenting the game in the chatting interface to allow user interaction; acquiring a first game result collected by the first game program when the first game program is finished; and sending the first game result as an instant message to the one or more other users in the chatting interface.

According to a second aspect of the present disclosure, there is provided a terminal device provided with an instant messaging tool. The terminal device includes: a processor and a memory configured to store commands executable by the processor. The processor is configured to: call a first game program corresponding to a game mode in a chatting interface of the instant messaging tool when the game mode is triggered in the chatting interface, the chatting interface being a chatting interface between a current user and one or more other users of the instant messaging tool, and the game mode being a mode of presenting the game in the chatting interface to allow user interaction; acquire a first game result collected by the first game program when the first game program is finished; and send the first game result as an instant message to the one or other more users in the chatting interface.

According to a third aspect of the present disclosure, there is provided a non-transitory computer-readable storage medium having stored therein instructions that, when executed by a processor of a mobile terminal, cause the mobile terminal to perform a method for playing a game in a chatting interface of an instant messaging tool provided on the mobile terminal. The method includes: calling a first game program corresponding to a game mode in the chatting interface when the game mode is triggered in the chatting interface, the chatting interface being a chatting interface between a current user and one or more other users of the instant messaging tool, and the game mode being a mode of presenting the game in the chatting interface to allow user interaction; acquiring a first game result collected by the first game program when the first game program is finished; and sending the first game result as an instant message to the one or more other users in the chatting interface.

It should be understood that, the above general description and the detailed description below are merely exemplary and explanatory, and do not limit the present disclosure.

BRIEF DESCRIPTION OF THE DRAWINGS

The accompanying drawings herein which are incorporated into and constitute a part of the description, illustrate the embodiments according to the present disclosure, and serve as explaining the principles of the present disclosure together with the description.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1A:
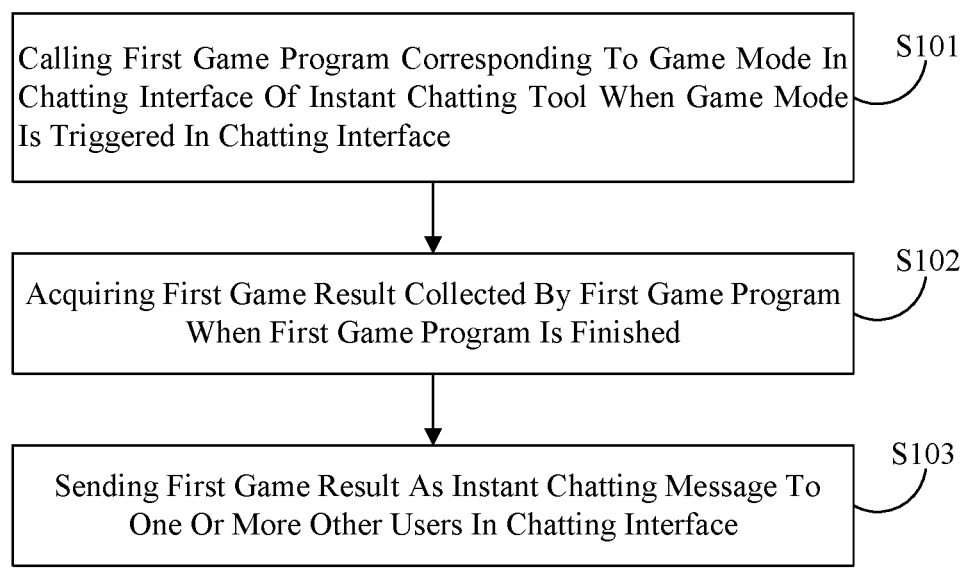
FIG. 1A is a flow chart showing a method for playing a game in a chatting interface according to an exemplary embodiment.
Figure 1B:
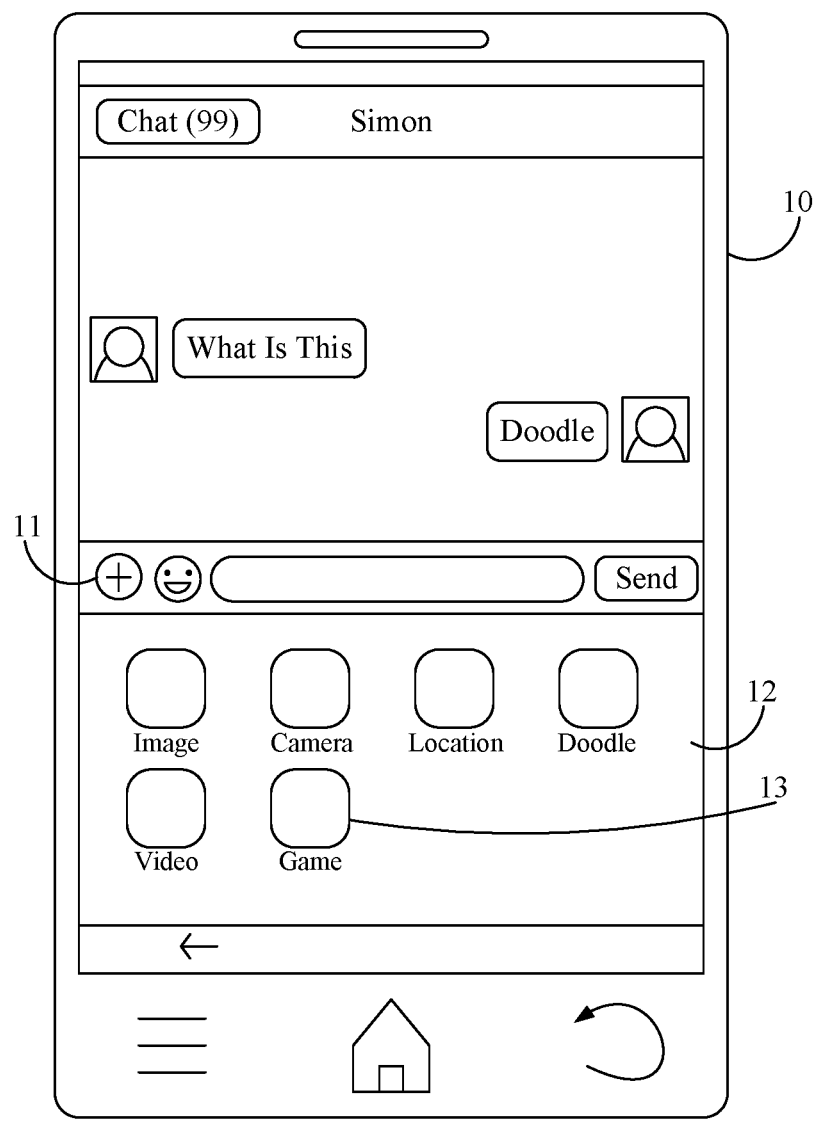
FIG. 1B is a first scene graph showing a method for playing a game in a chatting interface according to an exemplary embodiment.
Figure 1C:
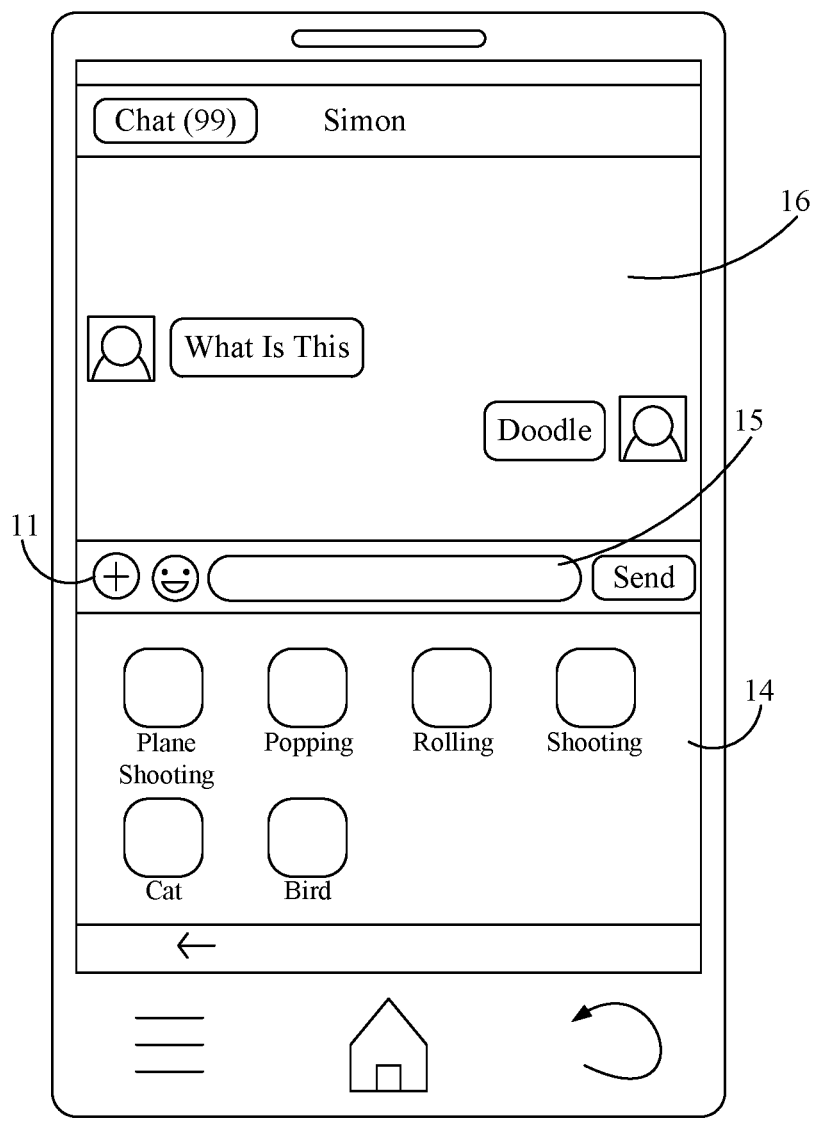
FIG. 1C is a second scene graph showing a method for playing a game in a chatting interface according to an exemplary embodiment.

FIG. 1A is a flow chart showing a method for playing a game in a chatting interface according to an exemplary embodiment. FIG. 1B is a first scene graph showing a method for playing a game in a chatting interface according to an exemplary embodiment. FIG. 1C is a second scene graph showing a method for playing a game in a chatting interface according to an exemplary embodiment. The method for playing the game in the chatting interface can be used for a terminal device, such as a smart phone or a tablet computer, provided with an instant messaging tool. As shown in FIG. 1A, the method for playing the game in the chatting interface includes following steps S101-S103.

In step S101, when a game mode is triggered in the chatting interface of the instant messaging tool, a first game program corresponding to the game mode is called in the chatting interface of the instant messaging tool. The chatting interface is a chatting interface between a current user and one or more other users of the instant messaging tool on the terminal device. The game mode is a mode of presenting a game in the chatting interface to allow user interaction.

In one embodiment, the instant messaging tool may be instant chatting software or an instant chatting application program, which can transmit instant text messages between/among two or more users, and the instant text messages sent from users of two communication sides can be instantly displayed on the chatting interfaces of the two communication sides. In one embodiment, as shown in FIG. 1B, it may be monitored whether a key 11 in the chatting interface is triggered. If the key 11 is triggered, it may be monitored whether a game key 13 corresponding to a game mode is triggered in a tool interface 12. When the game key 13 in the game mode is triggered, a game selection interface 14 is entered, as shown in FIG. 1C.

In one embodiment, a corresponding interface that corresponds to a game program can be provided for accessing the game program in the instant messaging tool. As shown in FIG. 1C, if it has been monitored that a first game program of "plane shooting" is triggered in the game selection interface 14, the first game program of "plane shooting" is called by the corresponding interface, thus improving compatibility of the instant messaging tool.

Alternatively, in another embodiment, at least one game program is built in the instant messaging tool. For example, the first game program of the "plane shooting" can be built in the instant messaging tool, and if it has monitored that the first game program of "plane shooting" is triggered in the game selection interface 14, the first game program of "plane shooting" is directly called by the instant messaging tool, thus simplifying the interface between the instant messaging tool and the external game program.

In step S102, a first game result collected by the first game program is acquired when the first game program is finished.

In one embodiment, the first game result can be collected by the first game program, and the instant messaging tool can acquire the first game result from the first game program.

In step 103, the first game result is sent as an instant message to one or more other users in the chatting interface.

In an exemplary embodiment, when a first game program of "plane shooting" is called, an input box 15 in the chatting interface is changed to a plane, which can shoot bullets. A display text region 16 can display characters and bubbles. The user icons in the display text region 16 fall down randomly. If an icon is hit by the bullets of the plane, a predetermined point is added to a user's score; and if an icon is not hit by the bullets of the plane, and the plane is hit by the icon, a predetermined point is deducted from the user's score. After a preset period, a result of the first game is collected, and the collected game result is displayed in the display text region 16 as the plane shooting score. As shown in FIG. 1C, the chatting interface displays that a user is instantly chatting with another user, named "Simon". The user can send the first game result of plane shooting as an instant chatting massage to Simon. If the chatting interface displays that the user is in a group chatting now, the user can send the first game result of plane shooting to other users in the group.

In this embodiment, by calling a first game program corresponding to a game mode in a chatting interface of an instant messaging tool, a user can quickly switch to the game mode in the chatting interface, and does not need to log off the instant messaging tool and then start the corresponding game program. As a result, a chatting interruption between the user and his/her friend(s) can be avoided, and the instant chatting is more interesting. When the first game program is finished, a first game result collected by the first game program is sent as an instant message to the one or more users of the chatting interface, thus his/her friend(s) is/are able to review the game result of the user. In this manner, the interaction between users during the instant user chatting is facilitate, and the functions of the instant messaging tool can be more diverse.

The method of playing the game in the chatting interface will be explained in further detail below.

Figure 2A:
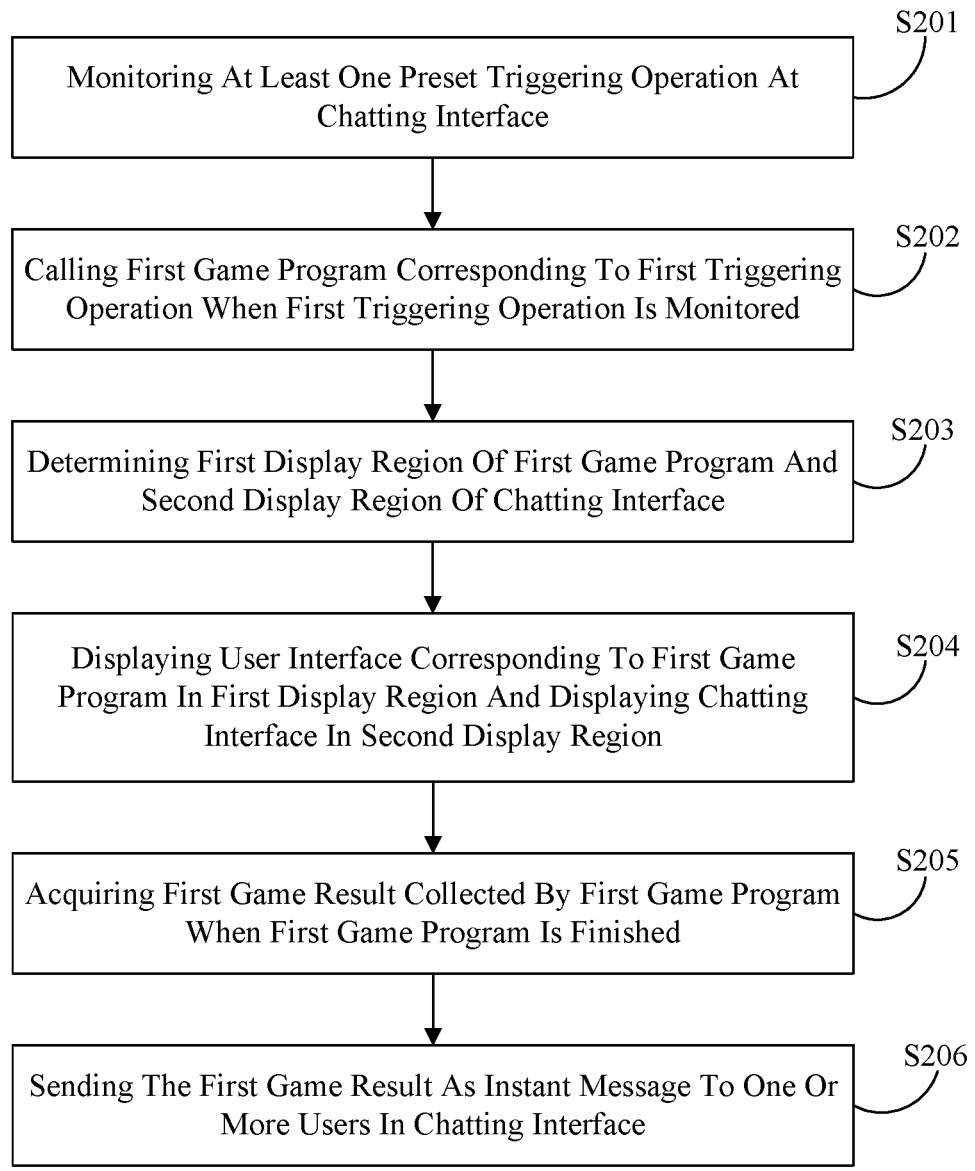
FIG. 2A is a flow chart showing a method for playing a game in a chatting interface according to an exemplary embodiment.
Figure 2B:
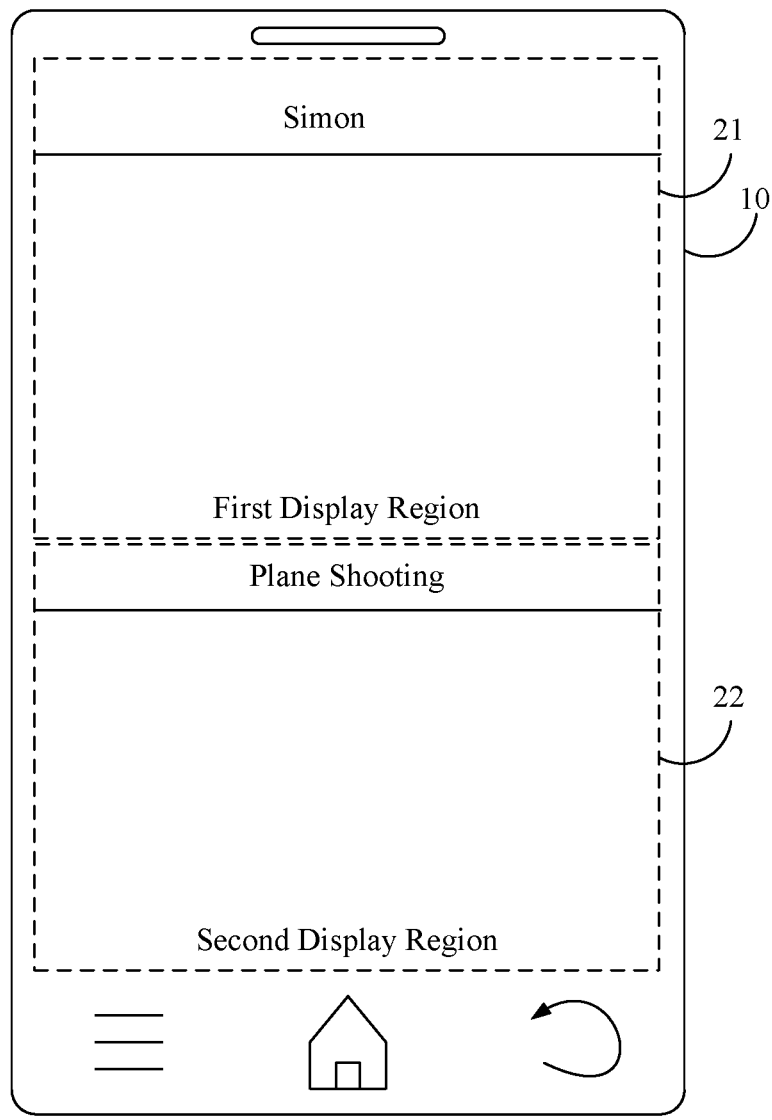
FIG. 2B is a schematic diagram showing a display region of a chatting interface according to an exemplary embodiment.

FIG. 2A is a flow chart showing a method for playing a game in a chatting interface according to an exemplary embodiment. FIG. 2B is a schematic diagram showing a display region of a chatting interface according to the exemplary embodiment. The method in this embodiment is provided for displaying a game program at a chatting interface, and will be described in combination with FIG. 2B and FIG. 1C. As shown in FIG. 2A, the method includes following steps.

In step S201, at least one preset triggering operation is monitored at the chatting interface. Each preset triggering operation of the at least one preset triggering operation corresponds to a preset game program;

In one embodiment, the preset triggering operation can correspond to a plurality of preset game programs in a game selection interface. As shown in FIG. 1C, the game selection interface 14 includes "Plane Shooting", "Popping", "Rolling", "Shooting", "Cat", and "Birds". The preset triggering operation can be a triggering operation of any one of the above games. In one embodiment, the preset triggering operation can be operations of single click, double click, long press, and the like;

In step S202, a first game program corresponding to a first triggering operation is called when the first triggering operation is monitored. The first triggering operation is one of a plurality of preset triggering operations of at least one game program.

For example, when the user triggers a first game program of "plane shooting", if "plane shooting" is a game program external to the instant messaging tool, the game program of "plane shooting" can be called by a corresponding interface; and if "plane shooting" is a game program built in the instant messaging tool, the game program of "plane shooting" can be directly called. When the first triggering operation is received, by calling the first game program corresponding to the first triggering operation, the user can play game in the chatting interface. In this manner, the user's operation is simplified and the user's chatting experience is improved.

It should be noted that the first triggering operation can be clicking of a specific function key or a special operation in the current chatting interface. For example, by shaking a mobile phone in the current chatting interface, game 1 is called; by sliding up or sliding down or other actions in the current chatting interface, game 2, game 3, or game 4 may be respectively called. Above are only examples and the first triggering operation includes but are not limited to above manners.

In step S203, a first display region of the first game program and a second display region of the chatting interface are determined.

In step S204, a user interface corresponding to the first game program is displayed in the first display region, and the chatting interface is displayed in the second display region;

In step 203 and step 204, in one embodiment, an orientation of a display screen of a terminal device can be detected, and the arrangement of the first display region and the second display region can be determined according to the screen orientation. For example, if the terminal device is in a portrait orientation, the first display region is arranged at a lower portion of the display screen, and the second display region is arranged at an upper portion of the display screen. If the terminal device is in a landscape orientation, the first display region is arranged at a left portion of the display screen, and the second display region is arranged at a right portion of the display screen.

Alternatively, in step 203 and step 204, a suspended window for displaying the first game program can be determined, and the user interface corresponding to the first game program is displayed in the suspended window. By displaying the first game program in the suspended window, the user can adjust the position of the user interface corresponding to the first game program in the user interface of instant chatting anytime.

In step S205, a first game result collected by the first game program is acquired when the first game program is finished.

In step S206, the first game result is sent as an instant message to the one or more users in the chatting interface.

Relevant description about step 205 and step 206 refers to above embodiments and is not repeated in detail herein.

In one exemplary embodiment, as shown in FIG. 2B, a user instantly chats with another user named "Simon" on the terminal device 10. When a first triggering operation corresponding to a first game program is monitored, a chatting interface for instant chatting can be displayed in a first display region 21, and a user interface of the game program can be displayed in a second display region 22.

According to this embodiment, on the basis of above beneficial effects, by displaying the chatting interface for instant chatting in the first display region and displaying the game program in the second display region, it is ensured that the user can play the game in the second display region while sending an instant message in the first display region. In this manner, switching between the instant messaging tool and the game program can be avoided for the user, and the interaction of the game program between the user and the peer(s) in an instant chatting process is facilitated.

Figure 3A:
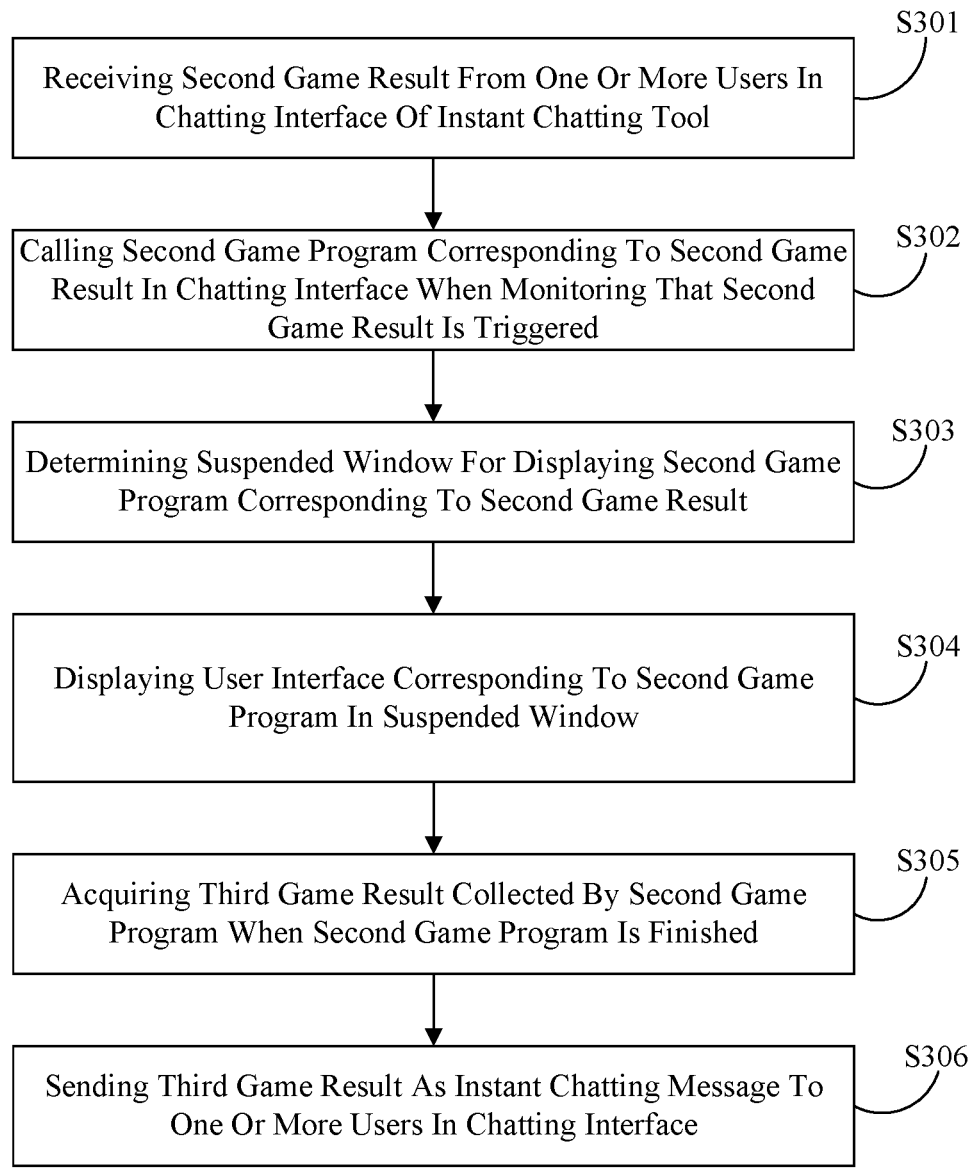
FIG. 3A is a flow chart showing a method for playing a game in a chatting interface according to an exemplary embodiment.
Figure 3B:
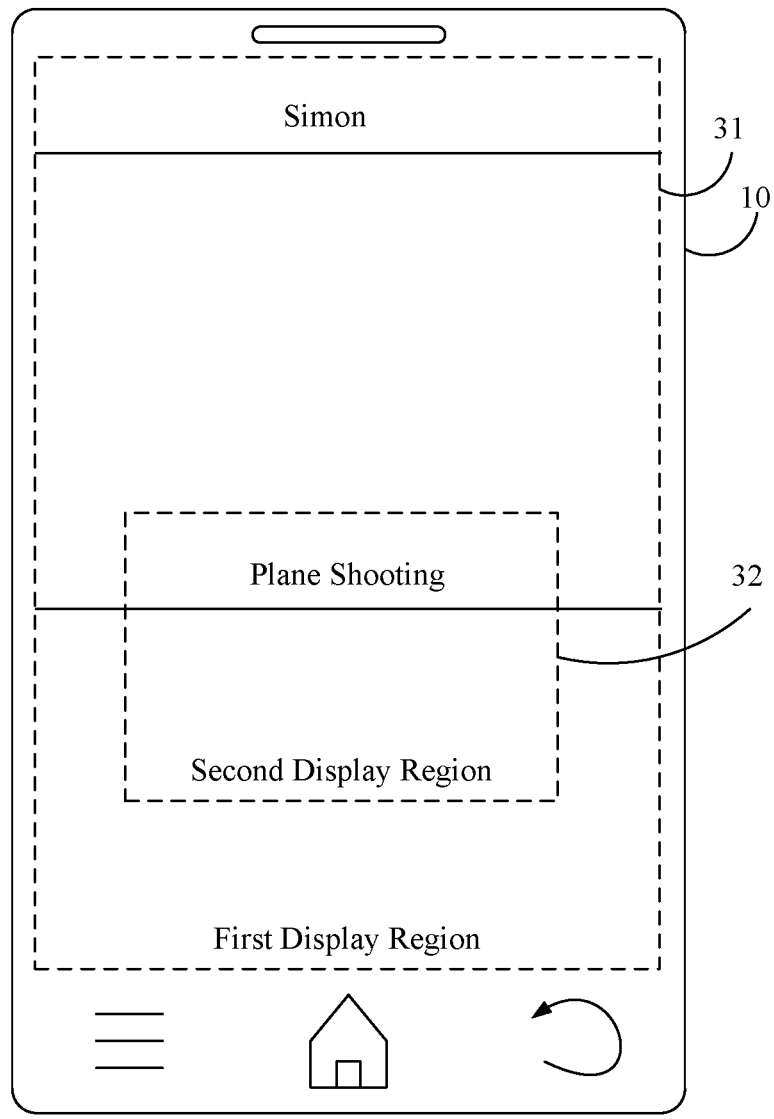
FIG. 3B is a schematic diagram showing a display region of a chatting interface according to an exemplary embodiment.

FIG. 3A is a flow chart showing a method for playing a game in a chatting interface according to an exemplary embodiment. FIG. 3B is a schematic diagram showing a display region of a chatting interface according to the exemplary embodiment. The method in this embodiment is provided to a current user of an instant messaging tool for sharing a game result with other users in a game mode and for playing a game together with the other users, and will be described in combination with FIG. 1B and FIG. 3B. As shown in FIG. 3A, the method includes following steps.

In step S301, a second game result is received from one or more other users in the chatting interface of the instant messaging tool. The second game result can be sent by the one or more other users as an instant message.

In step S302, a second game program corresponding to the second game result is called in the chatting interface when monitoring that the second game result is triggered by the current user. The second game result can be triggered by the current user performing a triggering operation on the instant message including the second game result. The triggering operation can be, for example, clicking, double clicking, long-pressing, or sliding.

In step S303, a suspended window for displaying the second game program corresponding to the second game result is determined.

In step S304, a user interface corresponding to the second game program is displayed in the suspended window;

In step S305, a third game result collected by the second game program is acquired when the second game program is finished. The third game result is the result of the second game program played by the current user.

In step S306, the third game result is sent as an instant message to the one or more users in the chatting interface.

As one exemplary scene, as shown in FIG. 1B, if a second game result from Simon is received in the chatting interface of the instant messaging tool, and if the second game result is triggered, a second game program can be directly called in a user interface of the instant messaging tool. Thus the current user is able to directly participate in the second game program played by Simon in the chatting interface of the instant messaging tool. In this manner, the interaction between the current user and his/her chatting peer in a game can be facilitated.

As shown in FIG. 3B, when the user chats with Simon instantly on the terminal device 10 and when a second game program of Simon needs to be called, the user interface of the second game program can be displayed in a suspended window 32, and content of instant chatting can be displayed in the chatting interface 31 of the instant messaging tool.

According to this embodiment, on the basis of the above beneficial effects, a second game program can be directly called in a user interface of an instant messaging tool, thus the user is able to directly participate in the second game program of the chatting peer in the chatting interface of the instant messaging tool. In this manner, the interaction between the user and the chatting peer in a game is facilitated. In addition, by displaying the second game program in the way of a suspended window, the user can adjust the position of the user interface corresponding to the second game program in the user interface of instant chatting anytime.

Figure 4:
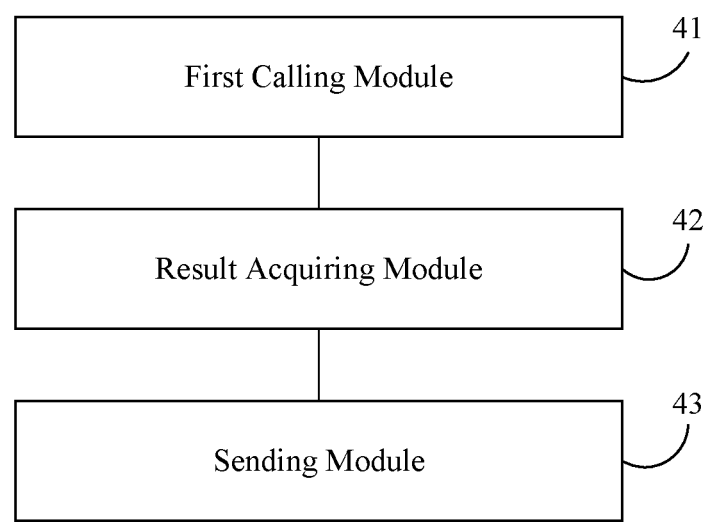
FIG. 4 is a block diagram showing a device for playing a game in a chatting interface according to an exemplary embodiment.

FIG. 4 is a block diagram showing a device for playing a game in a chatting interface according to an exemplary embodiment, which is used for a terminal device provided with an instant messaging tool. As shown in FIG. 4, the device for playing a game on a chatting interface includes a first calling module 41, a result acquiring module 42, and a sending module 43.

The first calling module 41 is configured to, when a game mode is triggered in the chatting interface of the instant messaging tool, call a first game program corresponding to a game mode in the chatting interface of the instant messaging tool. The chatting interface is a chatting interface between a current user and one or more users except the current user of the instant messaging tool on the terminal device. The game mode is a mode of presenting a game in the chatting interface to facilitate user interaction;

The result acquiring module 42 is configured to acquire a first game result collected by the first game program called by the first calling module 41 when the first game program is finished; and The sending module 43 is configured to send the first game result acquired by the result acquiring module 42 as an instant message to the one or more users in the chatting interface.

Figure 5:
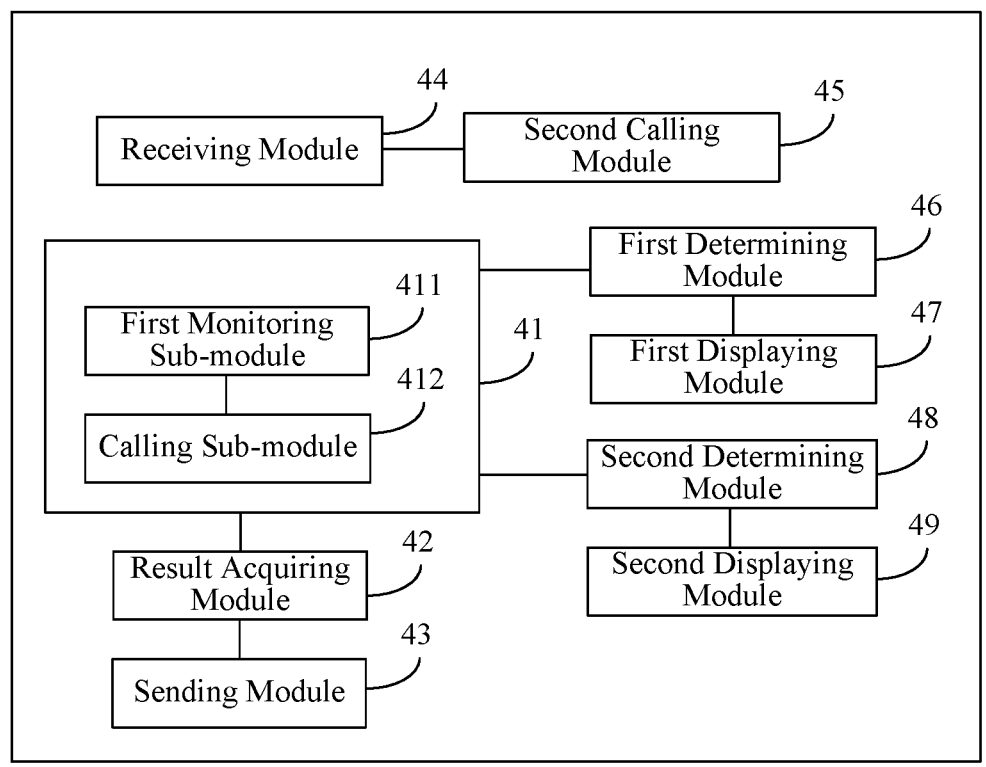
FIG. 5 is a block diagram showing a device for playing a game in a chatting interface according to an exemplary embodiment.

FIG. 5 is a block diagram showing another device for playing a game in a chatting interface according to an exemplary embodiment. As shown in FIG. 5, based on the embodiment as shown in FIG. 4, in one embodiment, the first calling module 41 includes a first monitoring sub-module 411 and a calling sub-module 412.

The first monitoring sub-module 411 is configured to monitor at least one preset triggering operation at the chatting interface. Each preset triggering operation of the at least one preset triggering operation corresponds to one preset game program.

The calling sub-module 412 is configured to call a first game program corresponding to a first triggering operation when the first monitoring sub-module 411 has monitored the first triggering operation. The first triggering operation is one of a plurality of preset triggering operations corresponding to at least one game program.

In one embodiment, the device also includes a receiving module 44 and a second calling module 45.

The receiving module 44 is configured to receive a second game result from the one or more users except the current user in the chatting interface of the instant messaging tool.

The second calling module 45 is configured to call a second game program corresponding to the second game result received by the receiving module 44 in the chatting interface when monitoring that the second game result is triggered.

In one embodiment, the device also includes a first determining module 46 and a first displaying module 47.

The first determining module 46 is configured to determine a first display region of the first game program corresponding to the game mode called by the first calling module 41, and determine a second display region of the chatting interface.

The first displaying module 47 is configured to display a user interface corresponding to the first game program in the first display region determined by the first determining module 46, and display the chatting interface in the second display region.

In one embodiment, the device also includes a second determining module 48 and a second displaying module 49.

The second determining module 48 is configured to determine a suspended window for displaying the first game program corresponding to the game mode called by the first calling module 41.

The second displaying module 49 is configured to display a user interface corresponding to the first game program in the suspended window determined by the second determining module 48.

With regard to the device in above embodiment, specific ways executable by respective modules have been described in detail in embodiments related to the method, and are not repeated in detail herein.

Figure 6:
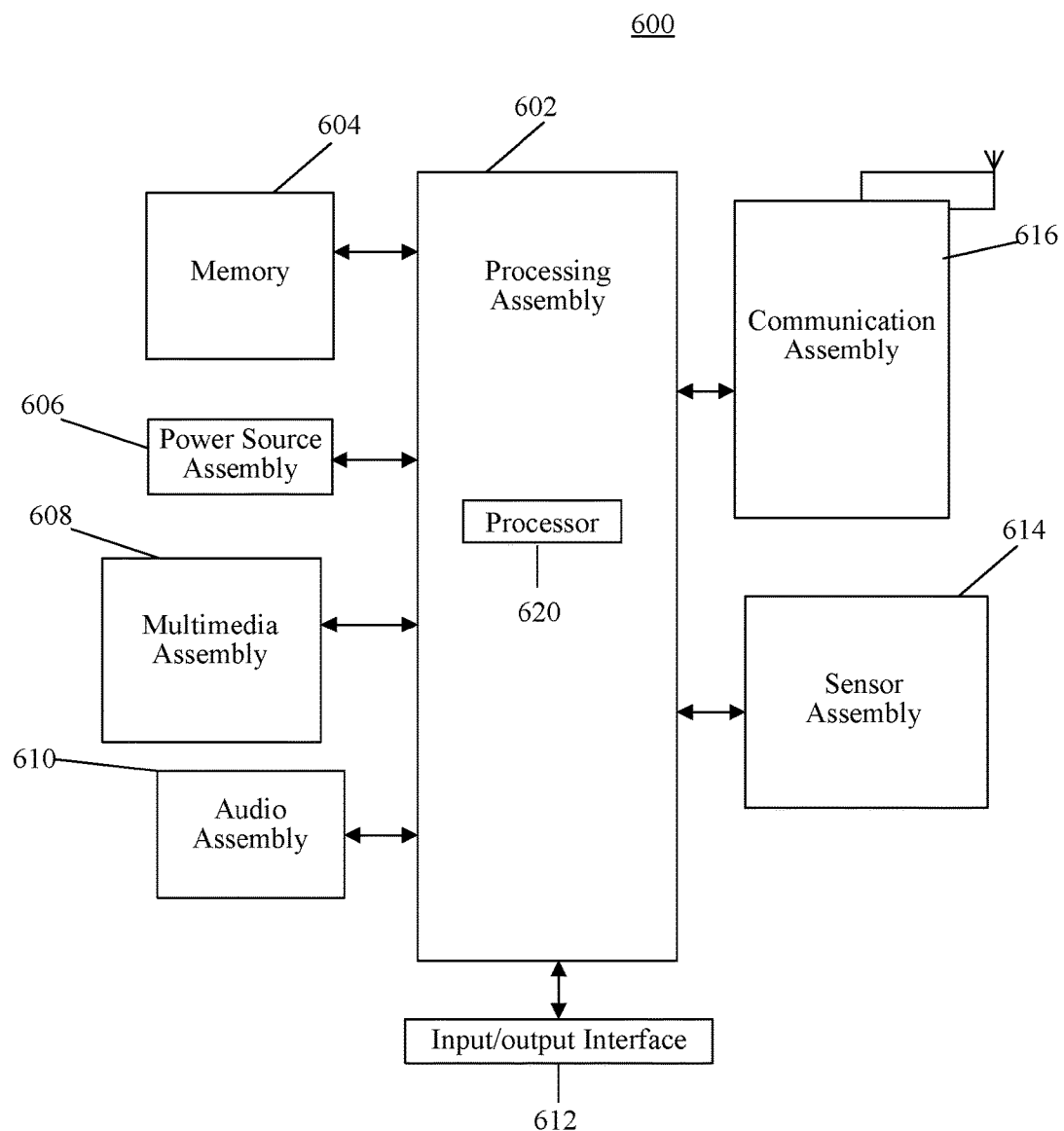
FIG. 6 is a block diagram showing a device for playing a game in a chatting interface according to an exemplary embodiment.

FIG. 6 is a block diagram showing a device 600 for playing a game in a chatting interface according to an exemplary embodiment. For example, the device 600 may be a mobile phone, a computer, a digital broadcast terminal, a message transceiver, a game control pad, a tablet device, a medical device, a fitness device, a personnel digital assistant and the like.

With reference to FIG. 6, the device 600 may include one or more of the following components: a processing assembly 602, a memory 604, a power source assembly 606, a multimedia assembly 608, an audio assembly 610, an input/output (I/O) interface 612, a sensor assembly 614 and a communication assembly 616.

The processing assembly 602 usually controls overall operations of the device 600, such as the operations associated with display, telephone call, data communication, camera operations, and recording operations. The processing assembly 602 may include one or more processors 620 to execute instructions to perform all or part of the steps in the above described method. In addition, the processing assembly 602 may include one or more modules that facilitate the interaction between the processing assembly 602 and other assemblies. For example, the processing assembly 602 includes a multimedia module, which is convenient for processing interaction between the multimedia assembly 608 and the processing assembly 602.

The memory 604 is configured to store various types of data to support operation on the device 600. Examples of these data include instructions for any applications or methods operated on the device 600, contact data, phonebook data, messages, pictures, videos, and the like. The memory 604 can be implemented using any type of volatile or non-volatile memory devices, or a combination thereof, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic or optical disk.

The power source assembly 606 provides power to various assemblies of the device 600. The power source assembly 606 includes a power management system, one or more power sources, and any other assemblies associated with generation, management, and distribution of power for the device 600.

The multimedia assembly 608 includes a screen providing an output interface between the device 600 and the user. In some embodiments, the screen may include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensor can not only sense a boundary of a touching or sliding action, but also sense a duration and pressure related to the touch or swipe action. In some embodiments, the multimedia assembly 608 includes a front camera and/or a rear camera. When the device 600 is in an operation mode, such as a photographing mode or a video mode, the front and/or rear camera can receive external multimedia data. Each front and rear camera can be a fixed optical lens system or have focus or optical zoom capability.

The audio assembly 610 is configured to output and/or input an audio signal. For example, the audio assembly 610 includes a microphone (MIC) configured to receive an external audio signal when the device 600 is in an operation mode, such as a calling mode, a recording mode and a voice recognition mode. The audio signal can be further stored in the memory 604 or be transmitted via the communication assembly 616. In some embodiments, the audio assembly 610 also includes a speaker for outputting audio signals.

The I/O interface 612 provides an interface between the processing assembly 612 and an external interface module, such as a keyboard, a click wheel, button, and the like. These buttons include, by are not limited to, a home button, a volume button, a start button, and a lock button.

The sensor assembly 614 includes one or more sensors which are used for providing various aspects of state evaluations for device 600. For example, the sensor assembly 614 can detect an opening/closing state of device 600, and relative positioning of assemblies, such as the display and the keypad, of device 600. The sensor assembly 614 can also detect position change of device 600 or one assembly of device 600, presence or absence of user contact with the device 600, an orientation or an acceleration/deceleration of the device 600, and temperature change of device 600. The sensor assembly 614 may include a proximity sensor configured to detect the presence of nearby objects without any physical contact. The sensor assembly 614 may also include an optical sensor, for example, a complementary metal oxide semiconductor (CMOS) or a charged couple device (CCD) image sensor, for use in imaging applications. In some embodiments, the sensor assembly 614 further includes an accelerometer sensor, a gyroscope sensor, a magnetic sensor, a pressure sensor, or a temperature sensor.

The communication assembly 616 is configured to facilitate wired or wireless communication between the device 600 and other devices. The device 600 can access a wireless network based on a communication standard, such as WiFi (Wireless Fidelity), 2G (The 2nd Generation Telecommunication), or 3G (The 3rd Generation Telecommunication), or a combination thereof. In one exemplary embodiment, the communication assembly 616 receives a broadcast signal or broadcast-related information from an external broadcast system via a broadcast channel. In one exemplary embodiment, the communication assembly 616 further includes a near field communication (NFC) module to facilitate short-range communication. For example, the NFC module can be realized based on a radio frequency identification device (RFID) technique, an infrared data association (IrDA) technique, an ultra-wide band (UWB) technique, a BlueTooth (BT) technique and other techniques.

In an exemplary embodiment, device 600 can be implemented with one or more application-specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements, for executing the above-described methods.

In an exemplary embodiment, there is also provided a non-temporary computer readable storage medium for storing instructions, such as stored in the memory 604, executable by the processor 620 of device 600, to perform the above described methods. For example, the non-temporary computer readable storage medium may be a read only memory (ROM), a random access memory (RAM), a compact disc random access memory (CD-ROM), a magnetic tape, a floppy disk, an optical data storage device and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of submodules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for playing a game in a chatting interface of an instant messaging tool provided on a terminal device, the method being executed by the terminal device and comprising:
    invoking a first game program corresponding to a game mode in the chatting interface of the instant messaging tool when the game mode is triggered in the chatting interface, the chatting interface being a chatting interface between a current user and one or more other users of the instant messaging tool, and the game mode being a mode of presenting the game in the chatting interface to allow user interaction;
    acquiring a first game result collected by the first game program when the first game program is finished;
    sending the first game result as an instant message to the one or more other users in the chatting interface;
    receiving a second game result from the one or more other users in the chatting interface of the instant messaging tool; and
    in response to monitoring that the second game result in the chatting interface is triggered, invoking a second game program corresponding to the second game result in the chatting interface.

2. The method according to claim 1, wherein invoking a first game program corresponding to the game mode in the chatting interface comprises:
    monitoring at least one preset triggering operation at the chatting interface, each preset triggering operation of the at least one preset triggering operation corresponding to a preset game program; and
    invoking the first game program corresponding to a first triggering operation when the first triggering operation is monitored, the first triggering operation being one of a plurality of preset triggering operations of at least one game program.

3. The method according to claim 1, further comprising:
    determining a first display region of the first game program corresponding to the game mode and a second display region of the chatting interface; and
    displaying a user interface corresponding to the first game program in the first display region and displaying the chatting interface in the second display region.

4. The method according to claim 1, further comprising:
    determining a suspended window for displaying the first game program corresponding to the game mode; and displaying a user interface corresponding to the first game program in the suspended window.

5. A terminal device, provided with an instant messaging tool, comprising:
   a processor; and
   a memory configured to store commands executable by the processor,
   wherein the processor is configured to:
      invoke a first game program corresponding to a game mode in a chatting interface of the instant messaging tool when the game mode is triggered in the chatting interface, the chatting interface being a chatting interface between a current user and one or more other users of the instant messaging tool, and the game mode being a mode of presenting the game in the chatting interface to allow user interaction;
      acquire a first game result collected by the first game program when the first game program is finished;
      send the first game result as an instant message to the one or more other users in the chatting interface;
      receive a second game result from the one or more other users in the chatting interface of the instant messaging tool; and
      in response to monitoring that the second game result in the chatting interface is triggered, invoke a second game program corresponding to the second game result in the chatting interface.

6. The terminal device according to claim 5, wherein the processor is further configured to:
   monitor at least one preset triggering operation at the chatting interface, each preset triggering operation of the at least one preset triggering operation corresponding to a preset game program; and
   invoke the first game program corresponding to a first triggering operation when the first triggering operation is monitored, the first triggering operation being one of a plurality of preset triggering operations of at least one game program.

7. The device according to claim 5, wherein the processor is further configured to:
   determine a first display region of the first game program corresponding to the game mode and a second display region of the chatting interface; and
   display a user interface corresponding to the first game program in the first display region and display the chatting interface in the second display region.

8. The device according to claim 5, wherein the processor is further configured to:
   determine a suspended window for displaying the first game program corresponding to the game mode; and
   display a user interface corresponding to the first game program in the suspended window.

9. A non-transitory computer-readable storage medium having stored therein instructions that, when executed by a processor of a mobile terminal, cause the mobile terminal to perform a method for playing a game in a chatting interface of an instant messaging tool provided on the mobile terminal, the method comprising:
   invoking a first game program corresponding to a game mode in the chatting interface of the instant messaging tool when the game mode is triggered, the chatting interface being a chatting interface between a current user and one or more other users of the instant messaging tool, and the game mode being a mode of presenting the game in the chatting interface to allow user interaction;
   acquiring a first game result collected by the first game program when the first game program is finished;
   sending the first game result as an instant message to the one or more other users in the chatting interface;
   receiving a second game result from the one or more other users in the chatting interface of the instant messaging tool; and
   in response to monitoring that the second game result in the chatting interface is triggered, invoking a second game program corresponding to the second game result in the chatting interface.

10. The non-transitory computer-readable storage medium according to claim 9, wherein the method further comprises:
   monitoring at least one preset triggering operation at the chatting interface, each preset triggering operation of the at least one preset triggering operation corresponding to a preset game program; and
   invoking the first game program corresponding to a first triggering operation when the first triggering operation is monitored, the first triggering operation being one of a plurality of preset triggering operations of at least one game program.

11. The non-transitory computer-readable storage medium according to claim 9, wherein the method further comprises:
   determining a first display region of the first game program corresponding to the game mode and a second display region of the chatting interface; and
   displaying a user interface corresponding to the first game program in the first display region and displaying the chatting interface in the second display region.

12. The non-transitory computer-readable storage medium according to claim 9, wherein the method further comprises:
   determining a suspended window for displaying the first game program corresponding to the game mode; and
   displaying a user interface corresponding to the first game program in the suspended window.

* * * * *